United States Patent [19]

Harris

[11] Patent Number: 4,877,050
[45] Date of Patent: Oct. 31, 1989

[54] VALVE HANDLE

[75] Inventor: Carl B. Harris, Rutland, Mass.

[73] Assignee: Thomas Smith Co. Inc., Worcester, Mass.

[21] Appl. No.: 264,336

[22] Filed: Oct. 28, 1988

[51] Int. Cl.⁴ .................... F16K 31/00; G05G 1/10
[52] U.S. Cl. .................... 137/315; 16/111 R; 16/114 R; 74/548; 251/291; 403/290; 403/344
[58] Field of Search .......... 16/110 R, 111 R, 113, 16/114 R, 125, 126; 74/543, 548, 523; 137/315; 251/291; 403/290, 344, 354

[56] References Cited

U.S. PATENT DOCUMENTS

| 757,195 | 4/1904 | Huff | 16/114 R |
| 924,463 | 6/1909 | Hofmann | 74/548 |
| 1,207,329 | 12/1916 | Roush | 74/548 |
| 1,543,145 | 6/1925 | Yeomans | 74/548 |
| 2,723,141 | 11/1955 | Ricks | 403/290 |
| 2,887,899 | 5/1959 | Urbas | 74/523 |
| 3,307,422 | 3/1967 | Olander | 74/548 |
| 4,570,901 | 2/1986 | Holtgraver | 74/543 |
| 4,615,236 | 10/1986 | Boots | 16/110 R |

Primary Examiner—George L. Walton
Attorney, Agent, or Firm—David G. Conlin; Robert T. Gammons

[57] ABSTRACT

An elongate handle for attachment to the stem of a valve provided with a clamp for receiving the stem and a bolt and nut for drawing the clamp into clamping engagement with the stem.

6 Claims, 1 Drawing Sheet

VALVE HANDLE

BACKGROUND OF THE INVENTION

Elongate handles for attachment to the stems of valves to effect rotation of the valves to open and/or close the same are shown in U.S. Pat. Nos. 1,543,145, 2,887,899, 2,733,942, and 2,667,240. It is the purpose of this invention to provide a valve handle of improved construction for attachment to the stem of a valve in that it has complete contact with the valve stem based on the length of the stem, it contains an opening in its end for non-rotatably receiving the stem, and it embodies a clamping device welded into the handle provided with a bolt and nut for drawing the clamping device into clamping engagement with the stem.

SUMMARY OF THE INVENTION

As herein illustrated, the valve handle according to this invention for effecting rotation of a valve stem comprises an elongate bar containing an opening corresponding in cross section to the cross section of the stem for receiving an end of the valve stem, a slot extending from the opening to the end thereof defining spaced supports and means for clamping the stem to the bar with its end disposed in said opening, comprising a U-shaped clamp disposed between said spaced supports attached to the bar with its legs situated at opposite sides of said opening and means for drawing the ends of the supports and, hence, the legs toward each other to clamp the legs against the stem.

BRIEF DESCRIPTION OF THE DRAWINGS

The invention will now be described in greater detail with reference to the accompanying drawings, wherein.

Figure 1:
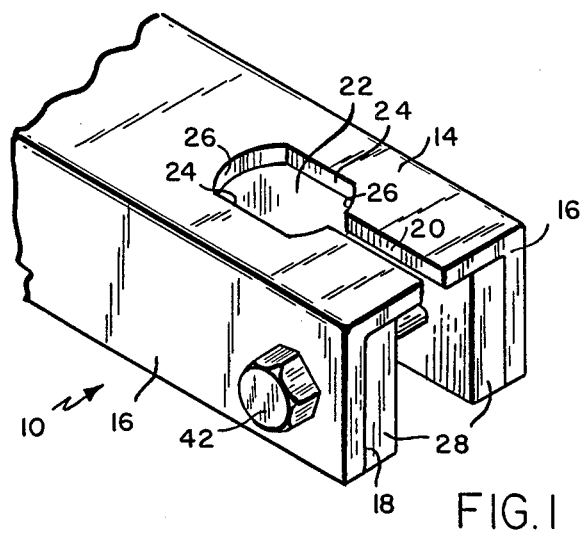
FIG. 1 is a fragmentary perspective of the valve handle which constitutes the subject matter of the instant invention.
Figure 3:
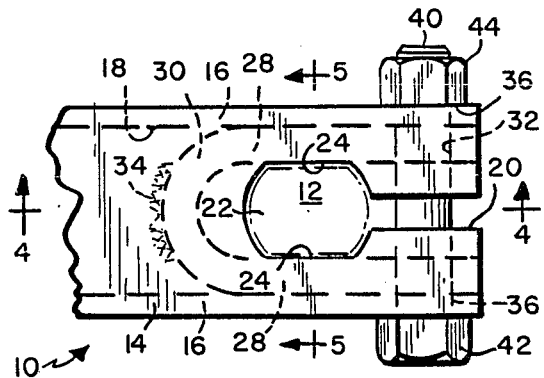
FIG. 3 is a plan view of the valve handle and the clamp member applied to a valve stem.
Figure 5:
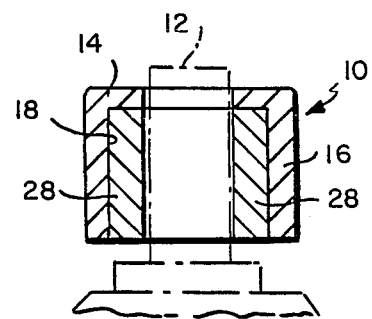
FIG. 5 is a section taken on the line 5—5 of FIG. 3.
Figure 4:
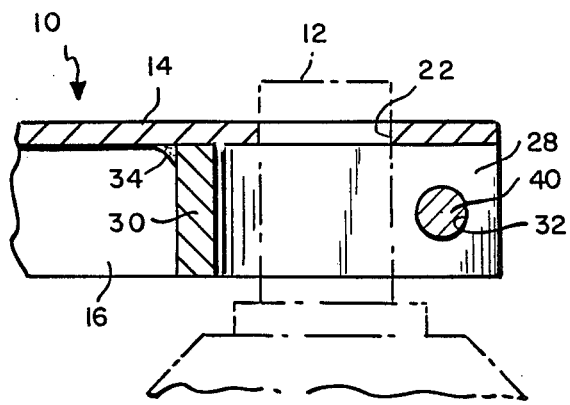
FIG. 4 is a section taken on the line 4—4 of FIG. 3.

As herein illustrated, there is shown in perspective, FIG. 1, a valve handle 10 structured at one end for clamping engagement with an end of a valve stem 12, FIGS. 3, 4 and 5. In accordance with the invention, the valve handle 10 is of U-shaped cross section comprising a flat back part 14 and spaced, parallel sides 16—16 perpendicular to the back part 14 such as to define a channel 18 longitudinally of the handle.

The back part 14 has at one end a longitudinal slot 20 at the longitudinal center line, at the inner end of which there is an opening 22. The opening 22 is configured to correspond to the cross section of the valve stem and, as herein shown, has spaced, parallel sides 24—24 and arcuate ends 26—26. The opening 22 is of a width slightly greater than the width of the valve stem and of a length slightly greater than the length of the valve stem to enable fitting the handle to the stem.

Figure 2:
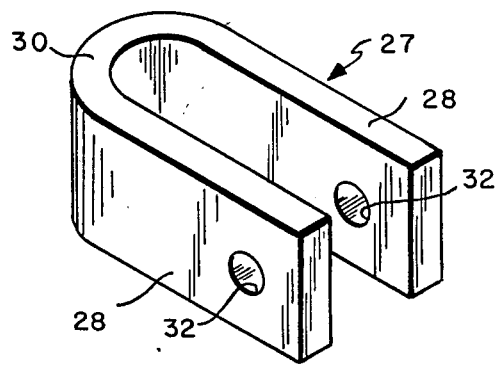
FIG. 2 is a perspective of a clamp member comprising a component of thee handle shown in FIG. 1.

A U-shaped clamp 27, FIG. 2, is provided for clamping the stem 12 to the handle when the handle is disposed on the stem, comprising spaced, parallel legs 28—28, FIG. 2, joined at one end by an arcuate back part 30. The legs 28—28 are provided with aligned openings 32—32.

In accordance with the invention, the U-shaped clamp 26 is dimensioned to be received within the handle in the channel 18 with its legs 28—28 parallel to the sides 24—24 and with its arcuate back part 30 spanning the channel. The arcuate back part 30 is fixed to the back part 14, FIG. 4, by a weldment 34, FIG. 4. The legs 28—28 are unattached to the sides 16—16.

Aligned holes 36—36 are formed in the sides 16—16 forwardly of the opening 22. The holes 36—36 are formed in the sides 16—16 in registration with the holes 32—32.

A threaded bolt 40 provided with a head 42 at one end and a nut 44 at the other end is disposed in the openings and provides for drawing the legs 28—28 into clamping engagement with the stem 12.

As thus constructed, when the handle is placed over the upper end of the stem such that the stem is disposed between the legs 28—28 and engaged within the opening 22, the handle can be securely fixed to the stem by tightening the nut on the bolt so as to draw the legs 28—28 into clamping engagement with the stem.

It should be understood that the present disclosure is for the purpose of illustration only and includes all modifications or improvements which fall within the scope of the appended claims.

What is claimed is:

1. A valve handle for effecting rotation of a valve stem having spaced, parallel sides, said valve handle being structured to be applied to the valve stem at right angles to the axis of the valve stem and extending radially from the axis of the valve stem, said valve handle comprising an elongate, rigid bar of U-shaped cross section embodying a substantially flat back part and transversely-spaced, parallel, flat side parts perpendicular to the back part and connected, respectively, at one edge to the opposite edges of the back part, said back part containing adjacent one end an opening situated midway between the side parts, said opening being spaced from said one end and embodying transversely-spaced, parallel edges and longitudinally-spaced arcuate edges for non-rotatably receiving the stem, said spaced, parallel edges of said openings being parallel to said flat side parts and said longitudinally-spaced, arcuate edges being disposed transversely of the flat back part, said opening being spaced from the end of the handle and said back part containing a medially-disposed slot extending from the arcuate end adjacent said end of the handle to the end of the handle and said side parts containing transversely-aligned holes midway between the upper and lower edges of the side parts and a U-shaped clamp embodying spaced, parallel sides corresponding in width to the width of the spaced, parallel side parts of the handle and an integral, semicircular end part joining the ends of the spaced, parallel side parts at one end, said U-shaped clamp being dimensioned to be received between the flat side parts of the handle with its ends coinciding with the ends of the side parts of the handle and with its semicircular end part disposed within the handle between the spaced, parallel side parts of the handle such that the semicircular end part extends beyond the opening in the flat back part such that when the handle is applied to the stem, the stem will be situated between the side parts of the handle forwardly of the semicircular back part and said side parts containing transversely-disposed openings so situated as to coincide with the openings in the spaced, parallel sides of the handle and a bolt disposed transversely of the handle within the openings in the handle and the U-shaped clamp, provided with a head at one end and a nut at the other end by means of which the side parts of the U-shaped clamp can be drawn into clamping engagement with the spaced, parallel sides of the valve stem, said opening being situated substantially midway between the arcuate back part and the clamping bolt such as to apply gripping pressure uniformly to the flat sides of the stem.

2. A valve handle according to claim 1 comprising means for securing the U-shaped clamp within the U-shaped handle with the sides of the U-shaped clamp coinciding with the sides of the U-shaped handle.

3. A valve handle according to claim 1 wherein the U-shaped clamp embodies a semicircular end part and wherein said semicircular end part is welded to the flat back part of the handle.

4. A valve handle according to claim 1 wherein said U-shaped handle and said U-shaped clamp are comprised of sheet metal.

5. A valve handle according to claim 1 wherein the U-shaped clamp embodies spaced, parallel legs, the outer sides of which are engaged with the inner sides of the U-shaped handle and the inner sides of which are spaced apart a distance corresponding to the transverse width of the valve stem.

6. A valve handle according to claim 1 for attachment to a threaded valve stem provided adjacent its upper end with spaced, parallel, flat sides for engagement with the sides of the U-shaped clamp.

* * * * *